US012763891B2

(12) United States Patent
Liu et al.

(10) Patent No.: US 12,763,891 B2

(45) Date of Patent: Oct. 13, 2026

(54) SCHEDULING METHOD AND APPARATUS

(71) Applicant: HUAWEI TECHNOLOGIES CO., LTD., Shenzhen (CN)

(72) Inventors: Zhihua Liu, Shenzhen (CN); Wenda Fan, Dongguan (CN); Jian Yang, Shenzhen (CN); Bing Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/632,201

(22) Filed: Apr. 10, 2024

(65) Prior Publication Data

US 2024/0275538 A1 Aug. 15, 2024

Related U.S. Application Data

(63) Continuation of application No. PCT/CN2022/117646, filed on Sep. 7, 2022.

(30) Foreign Application Priority Data

Oct. 19, 2021 (CN) ........................ 202111217641.9

(51) Int. Cl.

| | |
|---|---|
| ***H04L 5/00*** | (2006.01) |
| ***H04L 1/1812*** | (2023.01) |
| ***H04L 1/1867*** | (2023.01) |
| ***H04W 72/1273*** | (2023.01) |
| ***H04W 72/232*** | (2023.01) |

(52) U.S. Cl.

CPC .......... *H04L 5/0035* (2013.01); *H04L 1/1812* (2013.01); *H04L 1/1887* (2013.01); *H04W 72/1273* (2013.01); *H04W 72/232* (2023.01)

(58) Field of Classification Search

None

See application file for complete search history.

(56) References Cited

U.S. PATENT DOCUMENTS

| | | | | |
|---|---|---|---|---|
| 2021/0266095 | A1 * | 8/2021 | Kumar | H04L 5/0032 |
| 2022/0124511 | A1 * | 4/2022 | Kim | H04W 16/14 |
| 2022/0303092 | A1 * | 9/2022 | Maki | H04L 5/0048 |

(Continued)

FOREIGN PATENT DOCUMENTS

| | | | |
|---|---|---|---|
| CN | 102869106 | A | 1/2013 |
| CN | 103024908 | A | 4/2013 |
| CN | 104144503 | A | 11/2014 |

(Continued)

OTHER PUBLICATIONS

3GPP TSG-RAN WG1 Meeting #98, R1-1909296, "DL signals and channels for NR-U", Ericsson,Aug. 26-30, 2019, total 19 pages.

(Continued)

*Primary Examiner* — Brian S Roberts

(57) ABSTRACT

This application provides a scheduling method and an apparatus. The method includes: determining a quantity of symbols occupied by a first physical downlink control channel of a first cell in a time unit, where the symbol represents a unit of the time unit; and determining, based on the quantity of symbols, the 1st symbol occupied by a physical downlink shared channel of a second cell in the time unit, where the first cell and the second cell dynamically share a same spectrum resource.

20 Claims, 7 Drawing Sheets

(56) References Cited

U.S. PATENT DOCUMENTS

2024/0137921 A1* 4/2024 Kim .................... H04B 17/309

FOREIGN PATENT DOCUMENTS

CN 108366375 A 8/2018
CN 109391396 A 2/2019

OTHER PUBLICATIONS

3GPP TSG RAN WG1 #98, R1- 1908138,"Discussion on physical DL channel design in unlicensed spectrum", vivo, Aug. 26-30, 2019, total 10 pages.

3GPP TS 38.213 V15.2.0 (Jun. 2018), 3rd Generation Partnership Project; Technical Specification Group Radio Access Network; NR; Physical layer procedures for control (Release 15), total 99 pages.

Nokia et al: "Extension of the Dynamic Spectrum Sharing (DSS) Wid", 3GPP Draft; RP-201761, 3rd Generation Partnership Project (3GPP), Mobile Competence Centre ; 650, Route Deslucioles;F-06921 Sophia-Antipolis Cedex ; Francevol. TSG RAN, No. e-Meeting; 20200914-202009187 Sep. 2020 (Sep. 7, 2020), XP051931560, total 3 pages.

3GPP TS 38.213 V16.3.0 (Sep. 2020), 3rd Generation Partnership Project; Technical Specification Group Radio Access Network; NR; Physical layer procedures for control(Release 16), total 179 pages.

* cited by examiner

SCHEDULING METHOD AND APPARATUS

CROSS-REFERENCE TO RELATED APPLICATIONS

This application is a continuation of International Application No. PCT/CN2022/117646, filed on Sep. 7, 2022, which claims priority to Chinese Patent Application No. 202111217641.9, filed on Oct. 19, 2021. The disclosures of the aforementioned applications are incorporated herein by reference in these entireties.

TECHNICAL FIELD

This application relates to the field of communication technologies, and in particular, to a scheduling method and an apparatus.

BACKGROUND

A dynamic spectrum sharing (DSS) technology is a technology in which a new radio (NR) system and a long term evolution (LTE) system share a same spectrum. Because spectrum resources are scarce, this technology is used to improve resource utilization. The DSS technology implements gradual smooth transition from the LTE system to the NR system. When the DSS technology is used, resources that can be used by the NR system are limited, and a resource allocated by a network device to the LTE system is not fully used. Consequently, a resource waste is caused, and resource utilization in a network is reduced.

In other words, when the LTE system and the NR system share an overlapping spectrum resource, to avoid a conflict of the used resources, resource utilization of the NR system is not high. Therefore, how to improve the resource utilization of the network is an urgent problem to be resolved.

SUMMARY

This application provides a scheduling method and an apparatus, to resolve a problem of how to improve resource utilization of a network.

According to a first aspect, this application provides a scheduling method. The method may be performed by a network device, or a chip or a module in the network device. An example in which the method is performed by the network device is used for description herein. The method includes: The network device determines a quantity of symbols occupied by a first physical downlink control channel of a first cell in a time unit; and the network device may determine, based on the quantity of symbols, the 1st symbol occupied by a physical downlink shared channel of a second cell in the time unit, where the first cell and the second cell are dynamic spectrum sharing cells.

The method shown in this implementation is implemented, so that when the first cell and the second cell share a same spectrum resource by using a DSS technology, the network device can adjust, based on the quantity of symbols occupied by the first physical downlink control channel, the 1st symbol occupied by the physical downlink shared channel of the second cell, to flexibly adjust a scheduling range of the physical downlink shared channel, and improve resource utilization and spectral efficiency of the second cell.

In a possible implementation, the determining, based on the quantity of symbols, the 1st symbol occupied by a physical downlink shared channel of a second cell in the time unit includes: if the quantity of symbols is 0, determining that the 1st symbol occupied by the physical downlink shared channel of the second cell in the time unit is the 1st symbol in the time unit.

The method shown in this implementation is implemented, so that when the quantity of symbols occupied by the first physical downlink control channel is 0, the physical downlink shared channel of the second cell starts to be scheduled from the 1st symbol in the time unit. In this way, the physical downlink shared channel can occupy more resources in a shared spectrum resource, to improve resource utilization of the second cell in the shared spectrum resource.

In a possible implementation, the method further includes: transmitting data of the second cell by using a resource corresponding to a physical hybrid automatic repeat request indicator channel in the first cell, where the physical hybrid automatic repeat request indicator channel is located on the 1st symbol in the time unit.

The method shown in this implementation is implemented, so that data is not sent on the physical hybrid automatic repeat request indicator channel in the first cell. The resource corresponding to the physical hybrid automatic repeat request indicator channel may be used by the second cell to perform data transmission, to improve resource utilization of the second cell in a shared spectrum resource.

In a possible implementation, the method further includes: transmitting the data of the second cell by using a resource corresponding to a physical control format indicator channel in the first cell, where the physical control format indicator channel is located on the 1st symbol in the time unit.

The method shown in this implementation is implemented, so that in the first cell, data is not mapped to the resource corresponding to the physical control format indicator channel, and the resource corresponding to the physical control format indicator channel may be used by the second cell to perform data transmission, to improve resource utilization of the second cell in a shared spectrum resource.

In a possible implementation, the determining a quantity of symbols occupied by a first physical downlink control channel of a first cell in a time unit includes: if it is determined not to use the first physical downlink control channel in the first cell, determining that the quantity of symbols occupied by the first physical downlink control channel is 0.

The method shown in this implementation is implemented, so that when the first physical downlink control channel is not used in the first cell, the network device can accurately determine the quantity of symbols occupied by the first physical downlink control channel, to determine a position of the 1st symbol that can be occupied by the physical downlink shared channel of the second cell.

In a possible implementation, the determining, based on the quantity of symbols, the 1st symbol occupied by a physical downlink shared channel of a second cell in the time unit includes: if the quantity of symbols is 1, determining that the 1st symbol occupied by the physical downlink shared channel of the second cell in the time unit is the 2nd symbol in the time unit, where the first physical downlink control channel of the first cell occupies the 1st symbol in the time unit.

The method shown in this implementation is implemented, so that when the quantity of symbols occupied by the first physical downlink control channel is 1, the network device starts to schedule the physical downlink shared channel of the second cell from the 2nd symbol in the time unit. In this way, the physical downlink shared channel can occupy more resources in a shared spectrum resource, to improve resource utilization of the second cell in the shared spectrum resource.

In a possible implementation, the determining a quantity of symbols occupied by a first physical downlink control channel of a first cell in a time unit includes: if it is determined to use the first physical downlink control channel in the first cell and it is determined that the quantity of symbols occupied by the used first physical downlink control channel is less than 2, determining that the quantity of symbols occupied by the first physical downlink control channel is 1.

In a possible implementation, if in the first cell, no downlink reference signal is configured in the 2nd symbol in the time unit, the 1st symbol occupied by a second physical downlink control channel of the second cell in the time unit is the 2nd symbol or a 3rd symbol in the time unit.

The method shown in this implementation is implemented, so that the second physical downlink control channel of the second cell starts to be scheduled from the 2nd symbol or the 3rd symbol in the time unit. In this way, the second physical downlink control channel can occupy more resources in a shared spectrum resource, to improve resource utilization of the second cell in the shared spectrum resource.

In a possible implementation, the method further includes: sending first information to a terminal device in the second cell, where the first information indicates the 1st symbol occupied by the physical downlink shared channel in the time unit.

According to a second aspect, this application provides a scheduling method. The method may be performed by a terminal device, or a chip or a module in the terminal device. An example in which the method is performed by the terminal device is used for description herein. The method includes: A terminal device located in a second cell receives first information from a network device, where the first information indicates the 1st symbol occupied by a physical downlink shared channel of the second cell in a time unit; and the terminal device receives the physical downlink shared channel by using the 1st symbol, where a first cell and the second cell dynamically share a same spectrum resource.

It may be understood that the 1st symbol occupied by the physical downlink shared channel in the time unit is determined by the network device based on a quantity of symbols occupied by a first physical downlink control channel of the first cell in the time unit.

In a possible implementation, if the quantity of symbols is 0, the 1st symbol occupied by the physical downlink shared channel of the second cell in the time unit is the 1st symbol in the time unit.

In a possible implementation, the method further includes: sending or receiving data in a resource corresponding to a physical hybrid automatic repeat request indicator channel in the first cell, where the physical hybrid automatic repeat request indicator channel is located on the 1st symbol in the time unit.

In a possible implementation, the method further includes: sending or receiving data in a resource corresponding to a physical control format indicator channel in the first cell, where the physical control format indicator channel is located on the 1st symbol in the time unit.

For an implementation of this aspect, refer to the descriptions of the implementation of the first aspect. Details are not described herein again.

According to a third aspect, this application provides a scheduling method. The method may be performed by a network device, or a chip or a module in the network device. An example in which the method is performed by the network device is used for description herein. The method includes: if a preset condition is met, the network device reconfigures a quantity of cell-specific reference signal resources of a first cell, where the reconfigured quantity of cell-specific reference signal resources is less than a quantity of cell-specific reference signal resources before the reconfiguration; and the network device sends reconfiguration information to a terminal device in a second cell, where the reconfiguration information indicates a position of the cell-specific reference signal resource and the quantity of cell-specific reference signal resources, and a resource other than the cell-specific reference signal resource in a resource shared by the first cell and the second cell is used for data transmission of the terminal device in the second cell; and the first cell and the second cell are dynamic spectrum sharing cells.

The method shown in this implementation is implemented, so that when the preset condition is met, the network device reduces the quantity of cell-specific reference signal resources in the first cell, to increase a quantity of resources that can be used by the second cell. Therefore, spectral efficiency of the second cell is improved.

In a possible implementation, reconfiguring a quantity of cell-specific reference signal resources of a first cell includes: changing a port quantity of a cell-specific reference signal of the first cell from a first quantity to a second quantity, where the first quantity is greater than the second quantity.

In a possible implementation, the method further includes: changing a manner of sending a multimedia broadcast multicast service single frequency network subframe of the first cell from a first manner to a second manner, where periodicity duration corresponding to the first manner is first duration, and a quantity of multimedia broadcast multicast service single frequency network subframes sent in a periodicity corresponding to the first manner is a third quantity; periodicity duration corresponding to the second manner is second duration, and a quantity of multimedia broadcast multicast service single frequency network subframes included in a periodicity corresponding to the second manner is a fourth quantity; and the changing a manner of sending a multimedia broadcast multicast service single frequency network subframe of the first cell from a first manner to a second manner includes: the first duration is greater than the second duration, and/or the third quantity is less than the fourth quantity.

The method shown in this implementation is implemented, so that the network device can increase a quantity of MBSFN subframes by reducing periodicity duration of a sending periodicity of the MBSFN subframes, to reduce the quantity of cell-specific reference signal (CRS) resources. When the quantity of CRS resources is reduced, a CRS resource originally used for CRS transmission may be used for data transmission of a PDSCH of the second cell, to add a resource that can be used by the PDSCH of the second cell, reduce resource overheads in the second cell, and improve resource utilization of the second cell. In addition, the network device reduces the quantity of CRS resources by increasing a quantity of MBSFN subframes in each periodicity, to reduce the resource overheads in the second cell and improve the resource utilization of the second cell.

In a possible implementation, the preset condition includes at least one of the following: a service load of the first cell is less than or equal to a first load, and a service load of a co-coverage neighboring cell of the first cell is less than or equal to a second load.

In a possible implementation, the method further includes: suspending providing a service for a terminal device in the first cell.

In a possible implementation, the method further includes: the 1st symbol occupied by a physical downlink shared channel of the second cell in a time unit is the 1st symbol in the time unit.

The method shown in this implementation is implemented, so that the network device starts to schedule the physical downlink shared channel of the second cell from the 1st symbol in the time unit. In this way, the physical downlink shared channel can occupy more resources in a shared spectrum resource, to improve resource utilization of the second cell in the shared spectrum resource.

According to a fourth aspect, this application provides a scheduling method. The method may be performed by a terminal device, or a chip or a module in the terminal device. An example in which the method is performed by the terminal device is used for description herein. The method includes: A terminal device located in a second cell receives reconfiguration information from a network device, where the reconfiguration information indicates a position of a cell-specific reference signal resource and a quantity of cell-specific reference signal resources of a first cell, and a resource other than the cell-specific reference signal resource in a resource shared by the first cell and the second cell is used for data transmission of the terminal device in the second cell; and the first cell and the second cell are dynamic spectrum sharing cells. A reconfigured quantity of cell-specific reference signal resources is less than a quantity of cell-specific reference signal resources before reconfiguration.

According to a fifth aspect, this application further provides a communication apparatus, and the communication apparatus has a function of implementing any method or implementation provided in any one of the first aspect to the fourth aspect. The communication apparatus may be implemented by using hardware, or may be implemented by executing corresponding software by hardware. The hardware or software includes one or more units or modules corresponding to the foregoing functions.

In a possible implementation, the communication apparatus includes a processor, and the processor is configured to support the communication apparatus in performing a corresponding function of the network device in the foregoing method. The communication apparatus may further include a memory. The memory may be coupled to the processor, and the memory stores program instructions and data that are necessary for the communication apparatus. Optionally, the communication apparatus further includes an interface circuit, and the interface circuit is configured to support communication between the communication apparatus and a device such as a terminal device or a network device.

In a possible implementation, a structure of the communication apparatus includes a processing unit and a communication unit. These units may perform corresponding functions in the foregoing method examples. For details, refer to descriptions in the method provided in the first aspect or the third aspect. Details are not described herein again.

According to a sixth aspect, a communication apparatus is provided, including a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to execute a computer program or instructions stored in a memory, to implement the method in any possible implementation of the first aspect to the fourth aspect. Optionally, the apparatus further includes the memory, and the memory stores the computer program or the instructions.

According to a seventh aspect, a computer-readable storage medium is provided, where the computer-readable storage medium stores a computer program or instructions. When the computer program or the instructions are run on a computer, the computer is enabled to implement the method in any possible implementation of any one of the first aspect to the fourth aspect.

According to an eighth aspect, a computer program product that stores computer-readable instructions is provided. When the computer-readable instructions are run on a computer, the computer is enabled to implement the method in any possible implementation of the first aspect to the fourth aspect.

According to a ninth aspect, a chip is provided. The chip includes a processor, and may further include a memory. The processor is coupled to the memory, and is configured to execute a computer program or instructions stored in the memory, so that the chip implements the method in any possible implementation of the first aspect to the fourth aspect.

According to a tenth aspect, a communication system is provided. The system includes an apparatus (for example, a network device) for implementing the first aspect and an apparatus (for example, a terminal device) for implementing the second aspect.

DESCRIPTION OF EMBODIMENTS

The following describes in detail embodiments of this application with reference to the accompanying drawings of the specification.

Embodiments of this application may be applied to various mobile communication systems, for example, an NR system, an LTE system, a global system of mobile communication (GSM) system, a code division multiple access (CDMA) system, a general packet radio service (GPRS) system, a future communication system and other communication systems. Specifically, this is not limited herein.

In embodiments of this application, a terminal device may be a device with a wireless transceiver function or a chip that may be disposed in any device, or may be referred to as user equipment (UE), an access terminal, a subscriber unit, a subscriber station, a mobile station, a remote station, a remote terminal, a mobile device, a user terminal, a wireless communication device, a user agent, or a user apparatus. The terminal device in embodiments of this application may be a mobile phone, a tablet computer, a computer with a wireless transceiver function, a virtual reality (VR) terminal, an augmented reality (AR) terminal, a wireless terminal in industrial control, a wireless terminal in self-driving, or the like.

In embodiments of this application, a network device may be a radio access device in various standards, for example, may be a next generation NodeB (gNB) in an NR system, may be an evolved NodeB (eNB), a radio network controller (RNC) or a NodeB (NB), a base station controller (BSC), a base transceiver station (BTS), a home base station (for example, a home evolved NodeB or a home NodeB, HNB), a baseband unit (BBU), an access point (AP), or a wireless relay node, a wireless backhaul node, or a transmission point (TRP or TP) in a wireless fidelity (Wi-Fi) system, or may be a gNB or a transmission point in a 5G (NR) system, or one or one group (including a plurality of antenna panels) of antenna panels of a base station in a 5G system. The base station in the 5G system may also be referred to as a transmission reception point (TRP) or a next generation NodeB (gNB or gNodeB). The base station in embodiments of this application may be an integrated base station, or may be a base station that includes a central unit (CU) and a distributed unit (DU). The base station including the CU and the DU may also be referred to as a base station in which the CU and the DU are separated. For example, the base station includes a gNB-CU and a gNB-DU. The CU may further be separated into a CU control plane (CU-CP) and a CU user plane (CU-CP). For example, the base station includes a gNB-CU-CP, a gNB-CU-UP, and the gNB-DU.

Figure 1:
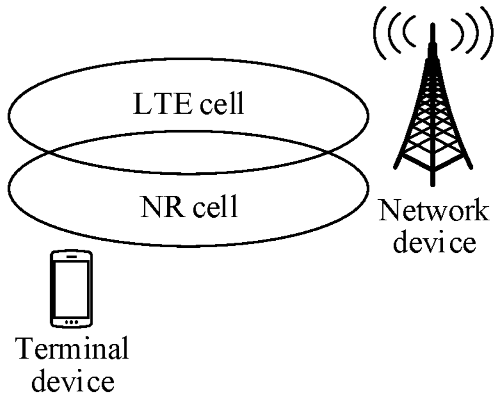
FIG. 1 is a schematic diagram of a network architecture applicable to an embodiment of this application.

FIG. 1 is a schematic diagram of a network architecture applicable to an embodiment of this application. The network architecture includes a network device and a terminal device. The network device may support a plurality of communication systems, and may configure a plurality of cells. For example, the network device may support an LTE system and an NR system, and may configure both an LTE cell and an NR cell. The LTE cell and the NR cell may share a same spectrum resource. This technology may be a dynamic spectrum sharing (DSS) technology. The foregoing technology is merely an example. In addition, a scenario in which the DSS technology is used is not limited in this application. The DSS technology may also be applicable to another network. This is not limited in this application. The terminal device may be a device that supports one or more of the foregoing plurality of communication systems. A type of the terminal device is not limited.

A scenario in which the LTE system and the NR system dynamically share a spectrum is used as an example. Because a physical downlink control channel (PDCCH) in the NR system cannot occupy a cell-specific reference signal (CRS) resource in the LTE system, an orthogonal frequency division multiplexing (OFDM) symbol that can be scheduled and used by the PDCCH and a physical downlink shared channel (PDSCH) in the NR system is limited. The following provides descriptions with reference to the accompanying drawings. The OFDM symbol may be a signal waveform generated by using an OFDM technology, and a length of the OFDM symbol in time domain is equal to a reciprocal of a subcarrier spacing of the waveform. For ease of description, the OFDM symbol is referred to as a symbol for short in the following descriptions.

For ease of understanding of a subsequent solution, a time unit, a subframe, and a multimedia broadcast multicast service single frequency network (MBSFN) subframe are first described herein. In the LTE system, one subframe includes 14 symbols, and in the NR system, one slot includes 14 symbols. For ease of description, in embodiments of this application, the subframe in the LTE system and the slot in the NR system may be collectively referred to as a time unit. The subframe in the LTE system may further be classified into two types: an MBSFN subframe and a non-MBSFN subframe. Resource element (RE) resources used for CRS transmission in the MBSFN subframe are fewer than RE resources used for CRS transmission in the non-MBSFN subframe. For example, when a port quantity of a CRS is 4, in a range of one resource block (RB), one non-MBSFN subframe includes 24 RE resources used for CRS transmission, and the MBSFN subframe includes only eight RE resources used for CRS transmission.

Figure 2:
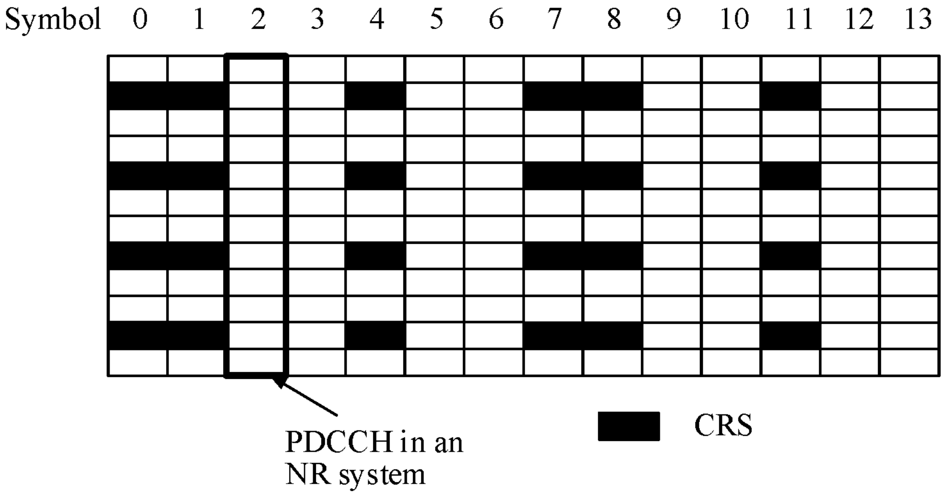
FIG. 2 is a schematic diagram of a single RB resource in a subframe when a CRS has four ports in an LTE system.

Assuming that a port (port) quantity of a CRS in the LTE system is 4, resources occupied by the CRS in the LTE system may be shown in FIG. 2. FIG. 2 is a schematic diagram of a structure of one slot. One slot includes 14 symbols, and the 1st symbol to a 14th symbol are sequentially referred to as a symbol 0 to a symbol 13. The RE resources occupied by the CRS are located on the symbol 0, the symbol 1, the symbol 4, the symbol 7, the symbol 8, and the symbol 11. To avoid a resource conflict with the LTE system, in this case, the PDCCH in the NR system is configured on the symbol 2. A range of symbols that can be scheduled and used by the PDSCH in the NR system is the symbol 2 to the symbol 13, and the first two symbols cannot be scheduled.

With reference to FIG. 2, one slot includes $14\times12=168$ RE resources, where one RE resource is represented by a small grid in FIG. 2. A small black grid represents the RE resource occupied by the CRS, and a small white grid represents an RE resource that is not occupied by the CRS. The same is true in other accompanying drawings described below. A quantity of RE resources that can be used by the NR system is: $168-2\times8-6\times4=128$. $2\times8$ represents a quantity of RE resources other than the RE resources occupied by the CRS on the symbol 0 and the symbol 1, and $6\times4$ represents a quantity of RE resources occupied by the CRS on the symbol 0, the symbol 1, the symbol 4, the symbol 7, the symbol 8, and the symbol 11.

It can be learned from the foregoing process that when the port quantity of the CRS in the LTE system is 4, for the NR system, an RE resource overhead rate is (168−128)/168=23.81%. In other words, at least 23.81% of RE resources cannot be used.

Figure 3:
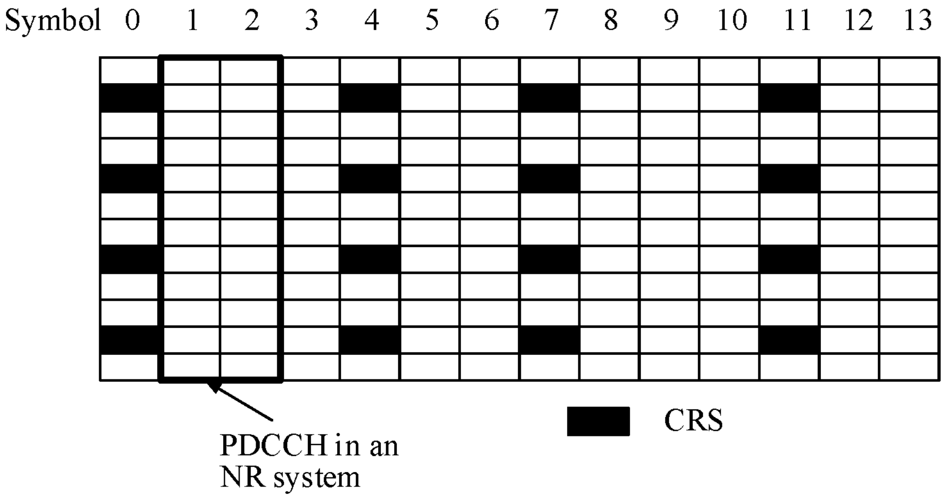
FIG. 3 is a schematic diagram of a single RB resource in a subframe when a CRS has two ports in an LTE system.

Assuming that a port quantity of a CRS in the LTE system is 2, RE resources occupied by the CRS in the LTE system may be shown in FIG. 3. FIG. 3 shows one slot. One slot includes 14 symbols, which are respectively a symbol 0 to a symbol 13. The RE resources occupied by the CRS are located on the symbol 0, the symbol 4, the symbol 7, and the symbol 11. To avoid a resource conflict with the LTE system, in this case, the PDCCH in the NR system is configured on the symbol 1 and/or the symbol 2 (where the figure shows a case in which the PDCCH in the NR system is configured on the symbol 1 and the symbol 2, and other cases are not shown). A range of symbols that can be scheduled and used by the PDSCH in the NR system is the symbol 1 to the symbol 13, and the symbol 0 cannot be scheduled.

With reference to FIG. 3, a quantity of RE resources that can be used by the NR system in one slot is: 168−1×8−4×4=144. 1×8 represents a quantity of RE resources other than the RE resources occupied by the CRS on the symbol 0, and 4×4 represents a quantity of RE resources occupied by the CRS on the symbol 0, the symbol 4, the symbol 7, and the symbol 11.

It can be learned from the foregoing process that when the port quantity of the CRS in the LTE system is 2, for the NR system, an RE resource overhead rate is (168−144)/168=14.29%.

Figure 4:
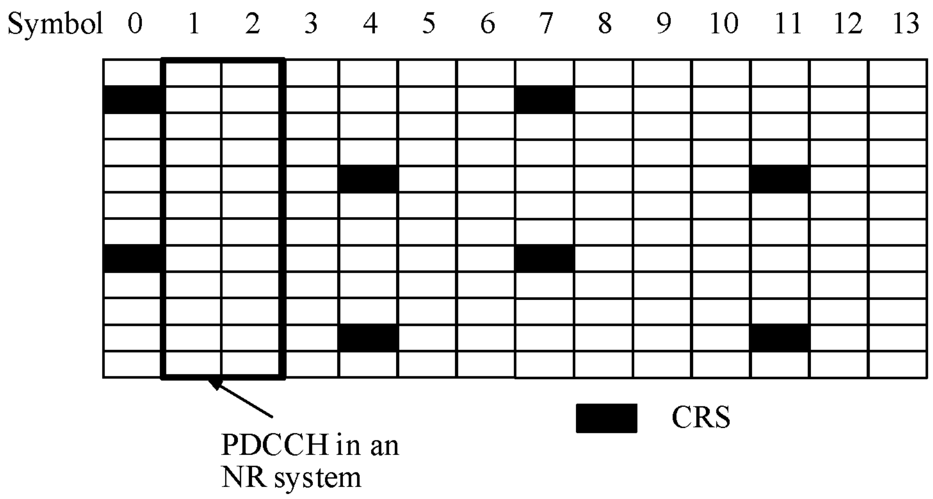
FIG. 4 is a schematic diagram of a single RB resource in a subframe when a CRS has one port in an LTE system.

Assuming that a port quantity of a CRS in the LTE system is 1, RE resources occupied by the CRS in the LTE system may be shown in FIG. 4. FIG. 4 shows one slot. One slot includes 14 symbols, which are respectively a symbol 0 to a symbol 13. The RE resources occupied by the CRS are located on the symbol 0, the symbol 4, the symbol 7, and the symbol 11. To avoid a resource conflict with the LTE system, in this case, the PDCCH in the NR system is configured on the symbol 1 and/or the symbol 2 (where the figure shows a case in which the PDCCH in the NR system is configured on the symbol 1 and the symbol 2, and other cases are not shown). A range of symbols that can be scheduled and used by the PDSCH in the NR system is the symbol 1 to the symbol 13, and the symbol 0 cannot be scheduled.

With reference to FIG. 4, a quantity of RE resources that can be used by the NR system in one slot is: 168−1×10−4×2=150. 1×10 represents a quantity of RE resources other than the RE resources occupied by the CRS on the symbol 0, and 4×2 represents a quantity of RE resources occupied by the CRS on the symbol 0, the symbol 4, the symbol 7, and the symbol 11.

It can be learned from the foregoing process that when the port quantity of the CRS in the LTE system is 1, for the NR system, an RE resource overhead rate is (168−150)/168=10.71%.

It can be learned from the foregoing descriptions that, in the DSS technology, because the NR system needs to share a spectrum resource with the LTE system, the NR system cannot schedule a resource occupied by the LTE system, and a resource that can be scheduled by the PDSCH in the NR system is limited. Consequently, resource utilization of the NR system is low.

Embodiments of this application provide a method. In a DSS scenario, resource overheads of an NR system can be reduced, a downlink rate of the NR system can be increased, and spectral efficiency of the NR system can be improved.

In embodiments of this application, unless otherwise specified or there is a logic conflict, terms and/or descriptions in different embodiments are consistent and may be mutually referenced, and technical features in different embodiments may be combined to form a new embodiment based on internal logical relationships of different embodiments.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on the functions and internal logic of the processes.

A network architecture and a service scenario described in embodiments of this application are intended to describe the technical solutions in embodiments of this application more clearly, but do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems.

In this application, interaction between a network device and a terminal device is used as an example for description. An operation performed by the network device may alternatively be performed by a chip or a module inside the network device, and an operation performed by the terminal device may alternatively be performed by a chip or a module inside the terminal device.

Figure 5:
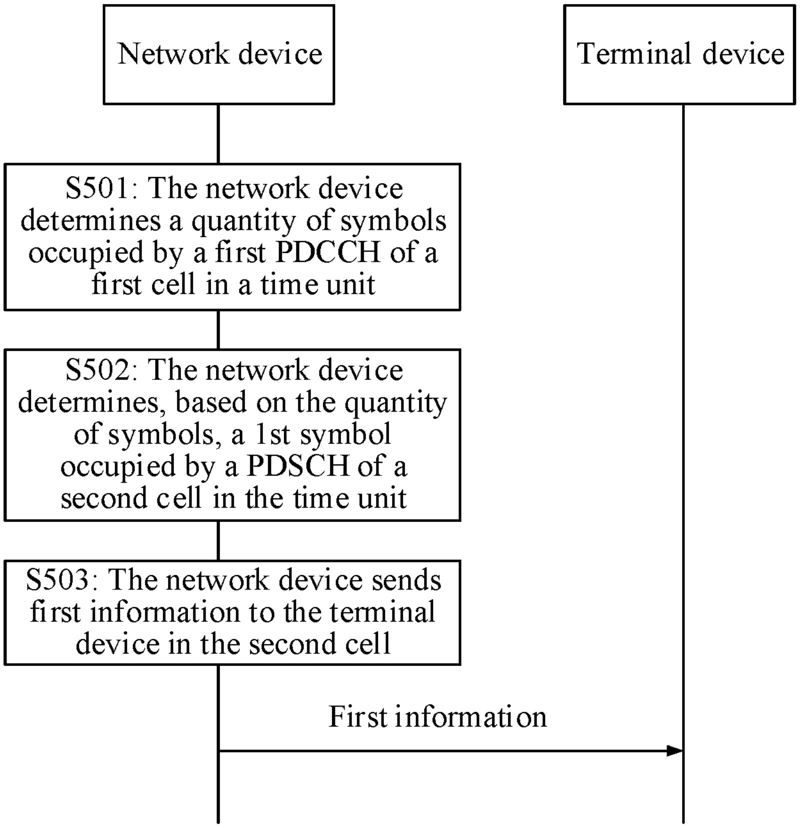
FIG. 5 is a schematic flowchart of a scheduling method according to an embodiment of this application.

FIG. 5 is a schematic flowchart of a scheduling method according to an embodiment of this application. In the method, a network device may support a plurality of communication systems. For example, the network device may support an LTE system and an NR system. The network device may establish a plurality of cells, for example, establish a first cell and a second cell. The first cell and the second cell are dynamic spectrum sharing cells. In other words, the first cell and the second cell dynamically share a same spectrum resource, to be specific, the first cell and the second cell share the same spectrum resource by using a DSS technology. In an implementation, the first cell is an LTE cell, and the second cell is an NR cell. In another implementation, the first cell is an NR cell, and the second cell is an LTE cell. The first cell and the second cell may alternatively be cells of another type. This is not limited in this embodiment of this application.

The first cell includes physical channels such as a first PDCCH, a physical hybrid automatic repeat request (HARQ) indicator channel (PHICH), and a physical control format indicator channel (PCFICH).

The first PDCCH may carry information such as uplink and downlink resource scheduling information sent to a terminal device, and the PHICH may carry a HARQ acknowledgment (ACK) feedback or a HARQ negative acknowledgement (NACK) feedback. The PCFICH indicates a quantity of symbols occupied by the first PDCCH in a time unit.

In the method shown in this embodiment, an example in which the first cell is the LTE cell and the second cell is the NR cell is used for description. The method may include the following steps.

S501: The network device determines the quantity of symbols occupied by the first PDCCH of the first cell in the time unit.

One symbol may be understood as one signal waveform, and a length of one symbol in time domain is equal to a reciprocal of a subcarrier spacing of the waveform. The length of the symbol in time domain may be used as a basic unit of the time unit. In other words, one time unit may include a plurality of symbols. The symbol in this application may be an OFDM symbol, or may be a symbol similar to the OFDM symbol. This is not limited in this application.

In this embodiment of this application, the time unit may be a period of time. Because dynamic spectrum sharing between two different systems is used in this embodiment of this application, names of the time unit in different systems may be different. For example, in the NR system, the time unit may be a slot, and in the LTE system, the time unit may be duration of a subframe.

A quantity of symbols that can be occupied by the first PDCCH of the first cell is not a fixed value, a maximum of two symbols can be occupied, and a minimum of zero symbols can be occupied. How the network device determines the quantity of symbols occupied by the first PDCCH is not limited in this embodiment of this application.

In a possible implementation, if the network device determines not to use the first PDCCH in the first cell, the quantity of symbols occupied by the first PDCCH is 0. For example, if a quantity of terminal devices in a radio resource control (RRC) connected mode in the first cell is less than or equal to a first threshold, it is determined not to use the first PDCCH, and the quantity of symbols occupied by the first PDCCH is 0.

In the conventional technology, the PHICH and the PCFICH occupy the 1st symbol by default, and the PHICH and the PCFICH occupy different frequency domain resources. In a specific embodiment shown in this application, the network device may transmit data of the second cell by using a resource occupied by the PHICH and/or a resource occupied by the PCFICH, to further improve resource utilization efficiency of a network.

Specifically, in a possible design, if the quantity of symbols occupied by the first PDCCH is 0, in the first cell, the network device may alternatively not send data on the PHICH. The PHICH occupies the 1st symbol in the time unit. Correspondingly, in the second cell, the network device may schedule, in a resource corresponding to the PHICH, the terminal device to perform data transmission. For example, the network device may transmit data to the terminal device in the resource corresponding to the PHICH, or receive data from the terminal device in the resource corresponding to the PHICH.

Because the PHICH occupies the 1st symbol in the time unit, when the network device does not send the data on the PHICH, the PHICH may not be occupied by the first cell. Therefore, the PHICH in the first cell may be used for data transmission of the second cell, to improve resource utilization of the second cell.

In a possible design, if the quantity of symbols occupied by the first PDCCH is 0, the network device may alternatively not map data to a resource corresponding to the PCFICH in the first cell. The PCFICH occupies the 1st symbol in the time unit. Mapping data to the resource may mean modulating data to the resource. Correspondingly, in the second cell, the network device may schedule, in the resource corresponding to the PCFICH, the terminal device to perform data transmission. For example, the network device may transmit data to the terminal device in the resource corresponding to the PCFICH, or receive data from the terminal device in the resource corresponding to the PCFICH.

Because the PCFICH occupies the 1st symbol in the time unit, when the data is not mapped to the resource corresponding to the PCFICH in the first cell, the resource corresponding to the PCFICH may be used for data transmission of the second cell, to improve resource utilization of the second cell.

In a possible implementation, if the network device determines to use the first PDCCH in the first cell, and determines that the quantity of symbols occupied by the first PDCCH is less than 2, the quantity of symbols occupied by the first PDCCH may be 1. For example, if a quantity of terminal devices in an RRC connected mode in the first cell is greater than a first threshold, the network device determines to use the first PDCCH in the first cell, determines that the quantity of symbols occupied by the first PDCCH is less than 2, to further determine that the quantity of symbols occupied by the first PDCCH is 1. The first threshold may be a number greater than or equal to 0. The first threshold may be determined based on an actual requirement. A specific value of the first threshold is not limited in this application. For example, the network device determines to use the first PDCCH in the first cell if the first threshold is equal to 0, to be specific, provided that there is at least one terminal device in the RRC connected mode in the first cell.

In this embodiment of this application, when the quantity of terminal devices in the RRC connected mode in the first cell is greater than the first threshold, a specific value of the quantity of symbols occupied by the first PDCCH may be determined based on a factor such as a service requirement of the terminal device. For example, if a quantity of resources blocks RBs needed by the terminal device in the RRC connected mode in the first cell is less than or equal to a second threshold, the quantity of symbols occupied by the first PDCCH is 1; or if a quantity of resources blocks RBs needed by the terminal device in the RRC connected mode in the first cell is greater than a second threshold, the quantity of symbols occupied by the first PDCCH is 2. The second threshold may be determined based on an actual requirement. This is not limited in this application. For example, if the second threshold is 10 RBs, when a quantity of resource blocks RBs needed by the terminal device in the RRC connected mode in the first cell is less than or equal to 10, the quantity of symbols occupied by the first PDCCH is 1; otherwise, the quantity of symbols occupied by the first PDCCH is 2. It may be understood that 10 RBs are a boundary value. Based on an actual requirement, the network device may alternatively determine, when a quantity of resource blocks RBs needed by the terminal device in the RRC connected mode in the first cell is less than 10, that the quantity of symbols occupied by the first PDCCH is 1. This is not limited in this application.

In a specific manner, after the network device determines the quantity of symbols occupied by the first PDCCH, the network device may send information to the second cell through an internal interface, where the information includes the quantity of symbols occupied by the first PDCCH of the first cell, and optionally, the information may further include information such as an index of the 1st symbol occupied by the first PDCCH. This manner helps the network device subsequently determine, based on the quantity of symbols occupied by the first PDCCH, a symbol occupied by a PDSCH of the second cell in the time unit.

S502: The network device determines, based on the quantity of symbols, the 1st symbol occupied by the PDSCH of the second cell in the time unit.

In this embodiment of this application, a specific position of the 1st symbol occupied by the PDSCH of the second cell in the time unit may be determined by the network device based on the quantity of symbols occupied by the first PDCCH of the first cell. Specifically, this may include but is not limited to the following several cases.

Case 1: If the quantity of symbols occupied by the first PDCCH of the first cell is 0, the network device may configure a scheduling range of the PDSCH of the second cell in the time unit as the 1st symbol to a last symbol in the time unit. In other words, the network device may configure the 1st symbol occupied by the PDSCH of the second cell in the time unit as the 1st symbol in the time unit. For example, the time unit includes 14 symbols, and the scheduling range of the PDSCH of the second cell in the time unit is the 1st symbol to a 14th symbol in the time unit.

It may be understood that in this embodiment of this application, that the network device configures that the PDSCH of the second cell can occupy the 1st symbol in the time unit does not mean that the network device definitely sends data on the 1st symbol in the time unit through the PDSCH of the second cell. Whether the network device sends the data on the 1st symbol in the time unit through the PDSCH of the second cell needs to be determined based on an actual data transmission requirement. Similarly, that the network device configures the scheduling range of the PDSCH of the second cell as the 1st symbol to the last symbol in the time unit does not mean that the network device definitely sends data on the 1st symbol to the last symbol in the time unit through the PDSCH of the second cell. Whether the network device sends the data on the 1st symbol to the last symbol in the time unit through the PDSCH of the second cell needs to be determined based on an actual data transmission requirement.

In the case 1, a scheduling range of a second PDCCH of the second cell in the time unit is the 1st symbol to the 3rd symbol in the time unit, and a symbol occupied by the second PDCCH cannot be the same as a symbol occupied by a CRS in the first cell.

Figure 6:
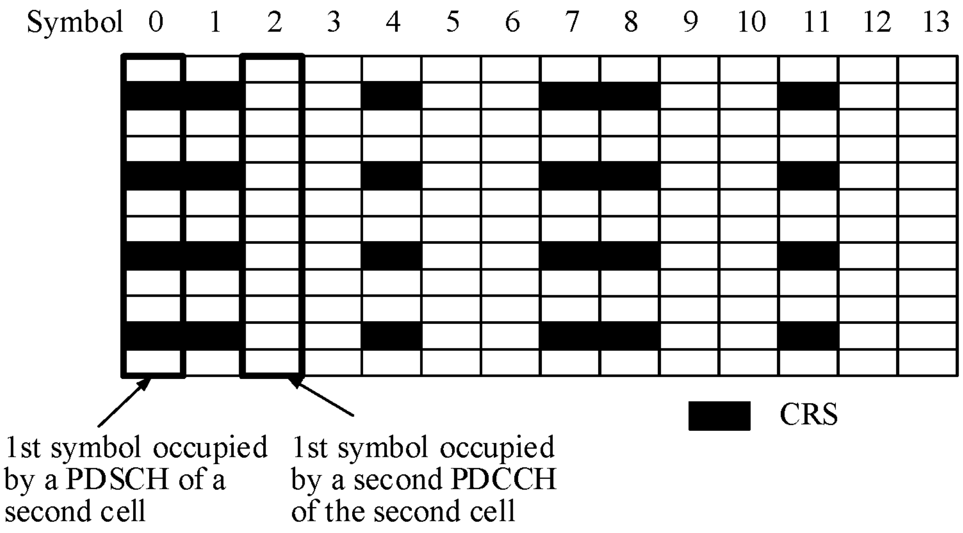
FIG. 6 is a schematic diagram of PDSCH scheduling according to an embodiment of this application (where a single RB resource in a single subframe is used as an example)

With reference to the descriptions of the case 1 in the embodiment shown in FIG. 5, for example, FIG. 6 is a schematic diagram of PDSCH scheduling. A resource shown in FIG. 6 includes one resource block (RB) in frequency domain, and the RB includes 12 subcarriers. The resource includes one subframe in the LTE system or one slot in the NR system in time domain. A length of one subframe in the LTE system is the same as a length of one slot in the NR system. In FIG. 6, an example in which one subframe in the LTE system includes 14 symbols is used. The 1st symbol to a 14th symbol in the 14 symbols are sequentially referred to as a symbol 0 to a symbol 13.

In FIG. 6, an example in which a port quantity of the CRS of the first cell is 4 is used. The 1st symbol and the 2nd symbol in the time unit include the CRS of the first cell.

With reference to FIG. 6, in the case 1, the network device may transmit data of the PDSCH of the second cell on the 1st symbol to the 14th symbol (namely, the symbol 0 to the symbol 13) in the time unit. In addition, because the symbol occupied by the second PDCCH of the second cell is a symbol that does not include the CRS of the first cell, the network device may configure the 1st symbol occupied by the second PDCCH of the second cell as the 3rd symbol, namely, the symbol 2, in the time unit.

In addition, if the port quantity of the CRS of the first cell is 1 or 2, the CRS of the first cell is located on the 1st symbol in the time unit. In this case, the network device may configure the scheduling range of the second PDCCH of the second cell as the 2nd symbol and the 3rd symbol in the time unit, and the network device may configure the scheduling range of the PDSCH of the second cell as the 2nd symbol to the 14th symbol in the time unit. For example, the network device may configure the symbol occupied by the second PDCCH as the 2nd symbol (namely, the symbol 1) in the time unit, and the network device may configure that the PDSCH of the second cell can occupy the 1st symbol (namely, the symbol 0) in the time unit. In other words, the network device may send the data of the PDSCH in time of the 1st symbol.

In other words, when a condition that the second PDCCH of the second cell does not occupy a symbol configured with the CRS of the first cell and the second PDCCH of the second cell is located on first three symbols in one time unit is met, if the quantity of symbols occupied by the first PDCCH of the first cell is 0, that is, the first PDCCH does not occupy any symbol, the PDSCH of the second cell may occupy the symbol originally occupied by the first PDCCH of the first cell, to increase a quantity of symbols that can be occupied by the PDSCH of the second cell. Therefore, utilization efficiency of a network resource is improved.

Case 2: If the quantity of symbols occupied by the first PDCCH of the first cell is 1, the network device may configure the first PDCCH of the first cell to occupy the 1st symbol in the time unit. Correspondingly, the network device may configure a scheduling range of the PDSCH of the second cell in the time unit as the 2nd symbol to a last symbol in the time unit. In other words, the network device may configure the 1st symbol occupied by the PDSCH of the second cell in the time unit as the 2nd symbol in the time unit. For example, the time unit includes 14 symbols, and the scheduling range of the PDSCH of the second cell in the time unit is the 2nd symbol to a 14th symbol in the time unit.

In the case 2, a scheduling range of a second PDCCH of the second cell in the time unit is the 2nd symbol and the 3rd symbol in the time unit, and a symbol occupied by the second PDCCH cannot not overlap a symbol occupied by a CRS in the first cell.

Figure 7:
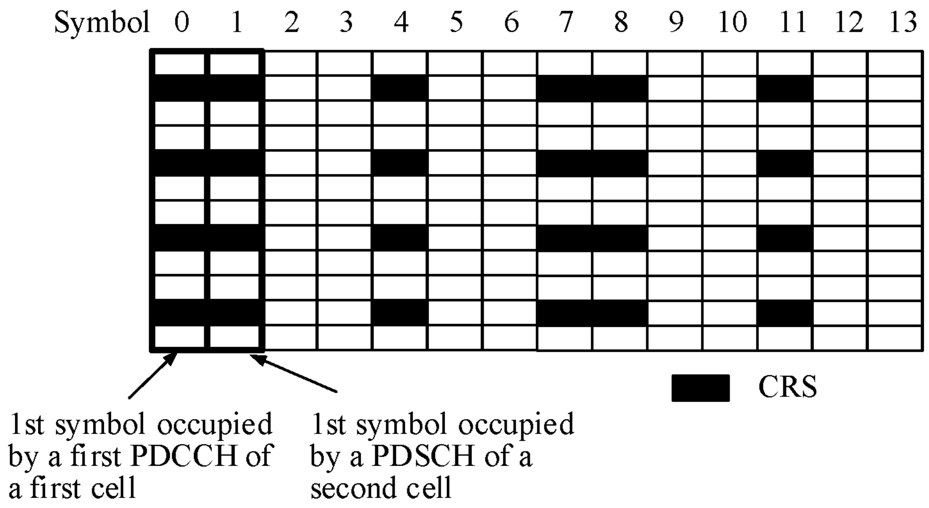
FIG. 7 is a schematic diagram of PDSCH scheduling according to an embodiment of this application (where a single RB resource in a single subframe is used as an example)

With reference to the descriptions of the case 2 in the embodiment shown in FIG. 5, for example, FIG. 7 is a schematic diagram of PDSCH scheduling. Similar to FIG. 6, in FIG. 7, an example in which a port quantity of the CRS of the first cell is 4 used. When the port quantity of the CRS of the first cell is 4, the 1st symbol and the 2nd symbol in the time unit include the CRS of the first cell.

With reference to FIG. 7, in the case 2, the network device may transmit data of the PDSCH of the second cell on the 2nd symbol to the 14th symbol (a symbol 1 to a symbol 13) in the time unit. In addition, because the symbol occupied by the second PDCCH of the second cell does not include the CRS of the first cell, the network device may configure the symbol occupied by the second PDCCH of the second cell as the 3rd symbol, namely, the symbol 2, in the time unit.

Similar to the case 1, if the port quantity of the CRS of the first cell is 1 or 2, the 1st symbol in the time unit includes the CRS of the first cell, and the network device may configure the 1st symbol occupied by the second PDCCH of the second cell as the 3rd symbol in the time unit, and configure the 1st symbol occupied by the PDSCH of the second cell as the 2nd symbol in the time unit.

In other words, when the quantity of symbols occupied by the first PDCCH of the first cell is 1, the network device configures the first PDCCH to occupy the 1st symbol in the time unit, and the network device configures the second PDCCH of the second cell to occupy the 3rd symbol in the time unit, and configures the PDSCH of the second cell to occupy the 2nd symbol in the time unit, to increase a quantity of symbols that can be occupied by the PDSCH of the second cell. Therefore, utilization efficiency of a network resource is further improved.

In this embodiment of this application, after determining the 1st symbol occupied by the PDSCH in the time unit, the network device may further indicate, to a terminal device in the second cell, the 1st symbol occupied by the PDSCH. For details, refer to the following descriptions.

S503: The network device sends first information to the terminal device in the second cell.

The first information indicates the 1st symbol occupied by the PDSCH in the time unit, to be specific, indicates the position of the 1st symbol occupied by the PDSCH in the time unit.

The first information may indicate a symbol number of the 1st symbol occupied by the PDSCH. For example, if the 1st symbol occupied by the PDSCH is the 1st symbol in the time unit, the symbol number indicated by the first information is the symbol 0; or if the 1st symbol occupied by the PDSCH is the 2nd symbol in the time unit, the symbol number indicated by the first information is the symbol 1.

The first information may further indicate the quantity of symbols occupied by the PDSCH. The first information may be carried by using downlink control information (DCI), or may be carried by using RRC signaling. This is not limited in this embodiment of this application.

In this embodiment of this application, the network device may further send second information to the terminal device in the second cell. The second information indicates information such as the 1st symbol occupied by the second PDCCH in the time unit and a quantity of symbols occupied by the second PDCCH.

The terminal device in the second cell may receive, based on the first information, the data of the PDSCH on the 1st symbol occupied by the PDSCH, or may receive, based on the second information, data of the second PDCCH on the 1st symbol occupied by the second PDCCH. A specific process is not limited. Details are not described herein again.

According to the foregoing method, when the first cell and the second cell share the same spectrum resource by using the DSS technology, the network device may adjust, based on the quantity of symbols occupied by the first PDCCH of the first cell, the quantity of symbols occupied by the PDSCH of the second cell, to implement flexible resource allocation, and improve resource utilization and spectral efficiency of the second cell.

The following describes in detail the method shown in FIG. 5 by using a specific embodiment. It is assumed that a first cell is an LTE cell, a second cell is an NR cell, and the first cell and the second cell share a same spectrum resource by using a DSS technology. A network device may determine a quantity of terminal devices in an RRC connected mode in the first cell.

Figure 8:
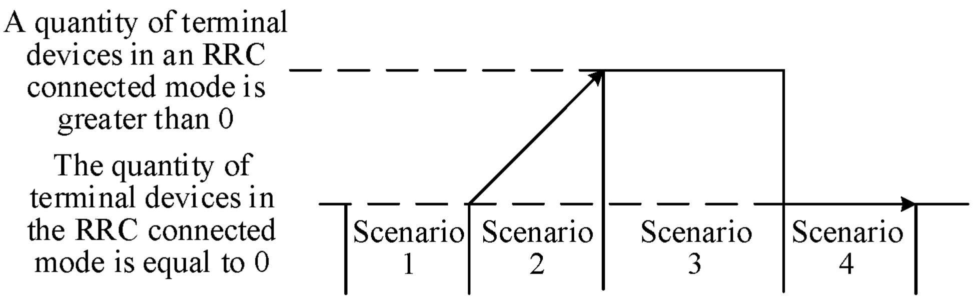
FIG. 8 is a schematic diagram of a scenario of a change of a quantity of terminal devices in a first cell according to an embodiment of this application.

As shown in FIG. 8, an example in which a first threshold is equal to 0 is used to describe how the network device performs resource scheduling on a PDSCH of the second cell when the quantity of terminal devices in the RRC connected mode in the first cell changes. FIG. 8 illustrates four scenarios, which are separately described below.

In a scenario 1, the quantity of terminal devices in the RRC connected mode in the first cell is equal to 0, that is, equal to the first threshold, and the first cell is in a state in which no user is connected.

In this case, a quantity of symbols occupied by a first PDCCH of the first cell may be 0, and the 1st symbol occupied by the PDSCH of the second cell is the 1st symbol in a time unit. In other words, a scheduling range of the PDSCH of the second cell in a time unit is a symbol 0 to a symbol 13 in the time unit. This maximizes a downlink throughput of the second cell.

In an implementation, the network device may alternatively not send data on a PHICH in the first cell. In this implementation, the network device may perform data transmission of the second cell by using the PHICH in the first cell, to improve resource utilization of the second cell.

In an implementation, the network device may alternatively not map data to a resource corresponding to a PCFICH in the first cell. In this implementation, the network device may perform data transmission of the second cell by using the resource corresponding to the PCFICH in the first cell, to improve resource utilization of the second cell.

For example, in a subframe other than a subframe that does not need to send a paging (paging) message and a system information block (SIB) system message in the first cell, the network device may not send the data on the PHICH, and/or not map the data to the resource corresponding to the PCFICH.

That the data is not sent on the PHICH may represent that data to be carried on the PHICH is not generated, and therefore the data is not sent on the PHICH. That the data is not mapped to the resource corresponding to the PCFICH may represent that data to be carried on the PCFICH is generated, but finally the data is not modulated to the resource corresponding to the PCFICH.

In a scenario 2, there is a terminal device initiating a random access process in the first cell, and the quantity of terminal devices in the RRC connected mode is greater than 0, that is, the quantity of terminal devices is greater than the first threshold.

The random access process may successively include a four-step message procedure: The terminal device sends a message 1, where the message 1 includes a preamble; the network device sends a message 2, where the message 2 may be a random access response (RAR) message; the terminal device sends a message 3, where the message 3 may be a response message of the message 2; and the network device sends a message 4, where the message 4 may be a contention resolution message. The scenario 2 may be described with reference to FIG. 9.

Figure 9:
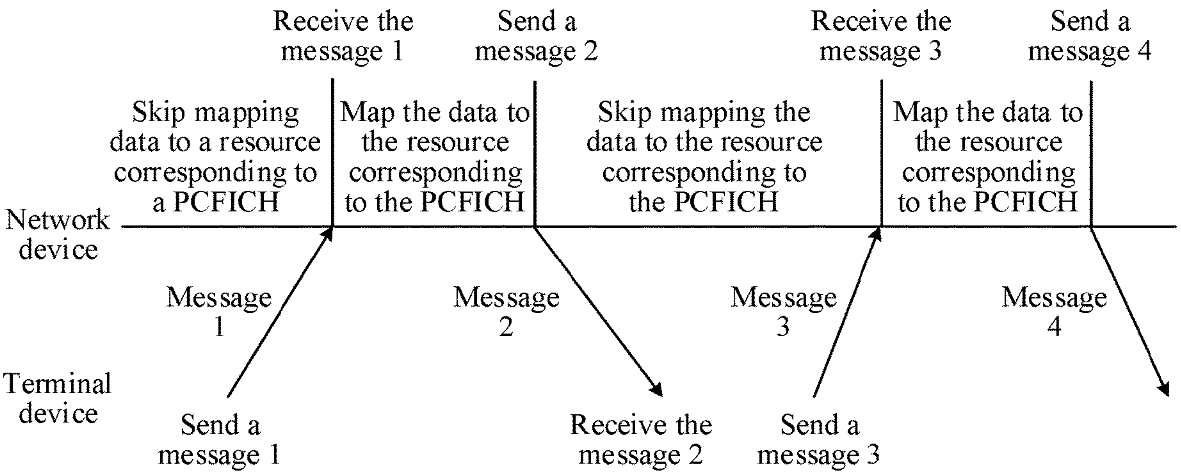
FIG. 9 is a schematic diagram of a random access process according to an embodiment of this application.

As shown in FIG. 9, when receiving the message 1 in the first cell, the network device may continue to map data to a resource corresponding to a PCFICH. Before sending the message 2 to the terminal device, the network device maps the data to the resource corresponding to the PCFICH in the first cell. After sending the message 2, the network device does not map the data to the resource corresponding to the PCFICH in the first cell. When receiving the message 3 from the terminal device, the network device maps the data to the resource corresponding to the PCFICH. After the terminal device accesses the first cell, the network device may send data on a PHICH.

In the foregoing process, the network device dynamically adjusts whether to map the data to the resource corresponding to the PCFICH, to improve resource utilization of the second cell and ensure that the data mapped to the resource corresponding to the PCFICH in the first cell can be received by the terminal device, so that the terminal device can successfully access the first cell.

In a scenario 3, there is a terminal device in the RRC connected mode in the first cell, and the network device maps data to a resource corresponding to a PCFICH, sends data on a PHICH, and no longer shares the 1st symbol in a time unit with the second cell for use.

The network device may determine, based on a service requirement of the terminal device, a quantity of symbols occupied by a first PDCCH of the first cell, and may determine, based on the quantity of symbols, the 1st symbol occupied by the PDSCH of the second cell in the time unit. For details about how to determine the 1st symbol occupied by the PDSCH of the second cell in the time unit, refer to the descriptions of S502 in FIG. 5. Details are not described herein again.

In a scenario 4, it is assumed that the quantity of terminal devices in the RRC connected mode in the first cell changes to 0 again. When determining that the quantity of terminal devices in the RRC connected mode is 0, in the first cell, the network device does not map data to a resource corresponding to a PCFICH, and does not send data on a PHICH.

In this case, a quantity of symbols occupied by a first PDCCH of the first cell may be 0, and a scheduling range of the PDSCH of the second cell in a time unit is a symbol 0 to a symbol 13 in the time unit.

According to the method shown in FIG. 5 to FIG. 9, if the quantity of symbols occupied by the first PDCCH of the first cell is 0, for example, the port quantity of the CRS of the first cell is 4, the PDSCH of the second cell may occupy the first two symbols in the time unit. In this case, a quantity of RE resources that can be used in a time unit in the second cell is increased from 128 to 144, resource overheads are reduced from 23.81% to 14.29%, and resource utilization is improved from 76.19% to 85.71%.

If the quantity of symbols occupied by the first PDCCH of the first cell is 1, and the port quantity of the CRS in the first cell is 2, a quantity of RE resources that can be used in a time unit in the second cell is increased from 144 to 152, resource overheads are reduced from 14.29% to 9.52%, and resource utilization is improved from 85.71% to 90.48%.

If the quantity of symbols occupied by the first PDCCH of the first cell is 1, and the port quantity of the CRS in the first cell is 1, a quantity of RE resources that can be used in a time unit in the second cell is increased from 150 to 160, resource overheads are reduced from 10.71% to 4.76%, and resource utilization is improved from 89.29% to 95.24%.

In other words, according to the method described in FIG. 5 to FIG. 9, in each time unit, a quantity of RE resources that can be occupied by the PDSCH in the NR cell is increased significantly, to further improve the utilization efficiency of the network resource. Therefore, a downlink throughput of the NR cell may be increased.

Figure 10:
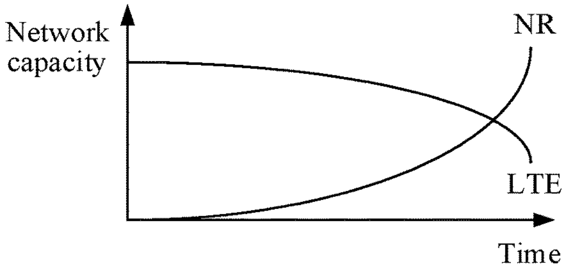
FIG. 10 is a schematic diagram of a change of a cell capacity according to an embodiment of this application.

In a DSS scenario, as shown in FIG. 10, at an early stage of network operation, an operator uses a DSS solution, so that a network can meet NR cell coverage while considering an LTE cell capacity. With the promotion of NR, a quantity of users/an amount of traffic in an NR cell is increased, and the LTE cell capacity is decreased. To balance a network capacity of an LTE cell and network performance of the NR cell, and meet the foregoing communication network trend, embodiments of this application further provide a method. The method may improve resource utilization of the NR cell and implement smooth evolution from an LTE network to an NR network.

Figure 11:
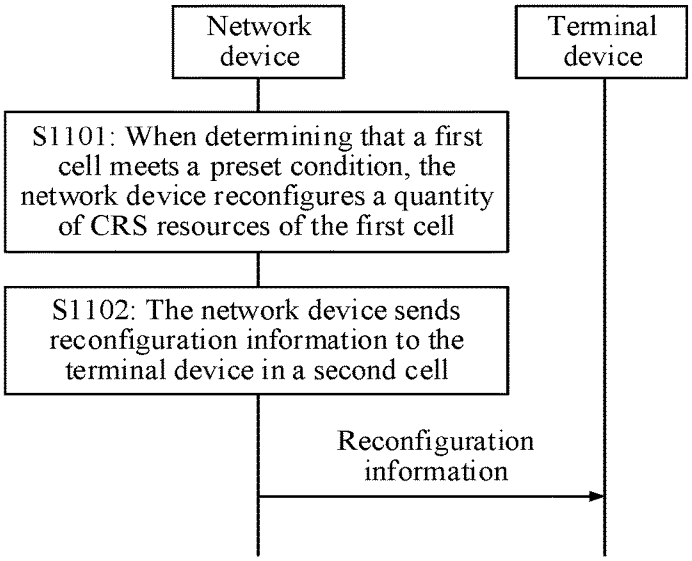
FIG. 11 is a schematic flowchart of a scheduling method according to an embodiment of this application.

FIG. 11 is a schematic flowchart of a scheduling method according to an embodiment of this application. In the method, an example in which a first cell may be an LTE cell and a second cell may be an NR cell is used. The first cell and the second cell dynamically share a same spectrum resource. The method includes the following steps.

S1101: When determining that the first cell meets a preset condition, a network device reconfigures a quantity of CRS resources of the first cell, where the reconfigured quantity of CRS resources is less than a quantity of CRS resources before the reconfiguration.

The CRS resource may be a resource occupied by a CRS. When the resource occupied by the CRS is an RE resource, one CRS resource may be one RE resource occupied by the CRS.

In this embodiment of this application, the preset condition may be determined based on a service load of the first cell and a service load of a co-coverage neighboring cell surrounding the first cell. For example, the preset condition may include at least one of the following:

The service load of the first cell is less than or equal to a first load, and the service load of the co-coverage neighboring cell of the first cell is less than or equal to a second load. A relationship between the first load and the second load is not limited in this application. For example, the first load may be greater than the second load.

When the preset condition is met, there may be a plurality of implementations for reconfiguring the quantity of CRS resources by the network device. For example, the network device may reconfigure the quantity of CRS resources by using but not limited to at least one of the following manners.

In a possible implementation, the network device changes a port quantity of the CRS of the first cell from a first quantity to a second quantity, where the first quantity is greater than the second quantity. Because a larger port quantity of the CRS indicates a larger quantity of CRS resources, the quantity of CRS resources may be reduced by reducing the port quantity of the CRS, to reduce resource overheads in the second cell, further save more resources that can be used for data transmission, and improve resource utilization of the second cell.

In a possible implementation, the network device changes a manner of sending an MBSFN subframe in the first cell from a first manner to a second manner, where periodicity duration corresponding to the first manner is first duration, and a quantity of MBSFN subframes included in a periodicity corresponding to the first manner is a third quantity; and periodicity duration corresponding to the second manner is second duration, and a quantity of MBSFN subframes included in a periodicity corresponding to the second manner is a fourth quantity. The first duration is greater than the second duration, and the third quantity is less than the fourth quantity.

Because in the MBSFN subframe, a symbol other than a symbol occupied by a first PDCCH of the first cell does not include the CRS resource, a quantity of CRS resources included in the MBSFN subframe is far less than a quantity of CRS resources included in a non-MBSFN subframe. Periodicity duration of a sending periodicity of the MBSFN subframe is reduced, so that a quantity of MBSFN subframes can be increased, thereby reducing the quantity of CRS resources. When the quantity of CRS resources is reduced, a CRS resource originally used for CRS transmission may be used for data transmission of a PDSCH of the second cell, to add a resource that can be used by the PDSCH of the second cell, reduce resource overheads in the second cell, and improve the resource utilization of the second cell. In addition, the quantity of CRS resources is reduced by increasing a quantity of MBSFN subframes in each periodicity, to reduce the resource overheads in the second cell and improve the resource utilization of the second cell.

Figure 12:
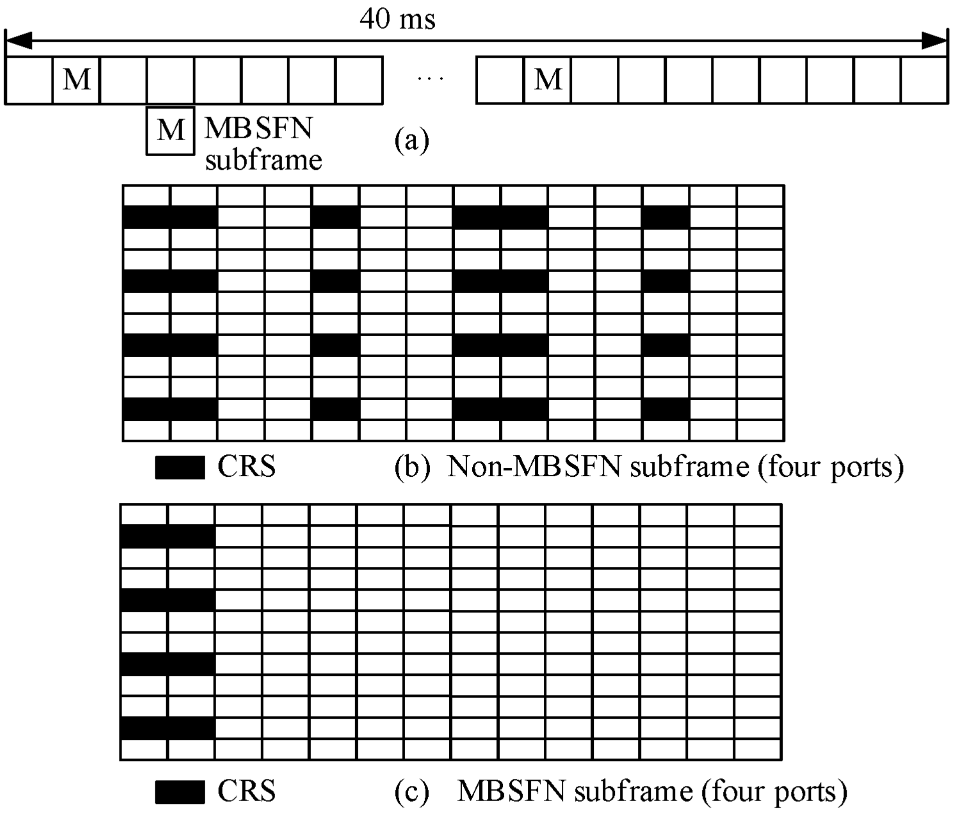
FIG. 12 is a schematic diagram of an MBSFN subframe configuration in an LTE cell according to an embodiment of this application.

For example, before the preset condition is met, refer to FIG. 12. As shown in (a) in FIG. 12, in the first cell, the manner of sending the MBSFN subframe is: The network device sends two MBSFN subframes every 40 milliseconds. A subframe marked with "M" represents the MBSFN subframe, and a subframe that is not marked with "M" represents the non-MBSFN subframe. A structure of the non-MBSFN subframe is shown in (b) in FIG. 12. When the port quantity of the CRS is 4, the quantity of CRS resources included in the non-MBSFN subframe is 24. A structure of the MBSFN subframe is shown in (c) in FIG. 12. When the port quantity of the CRS is 4, the quantity of CRS resources included in the MBSFN subframe is 8, and is less than the quantity of CRS resources included in the non-MBSFN subframe.

Figure 13:
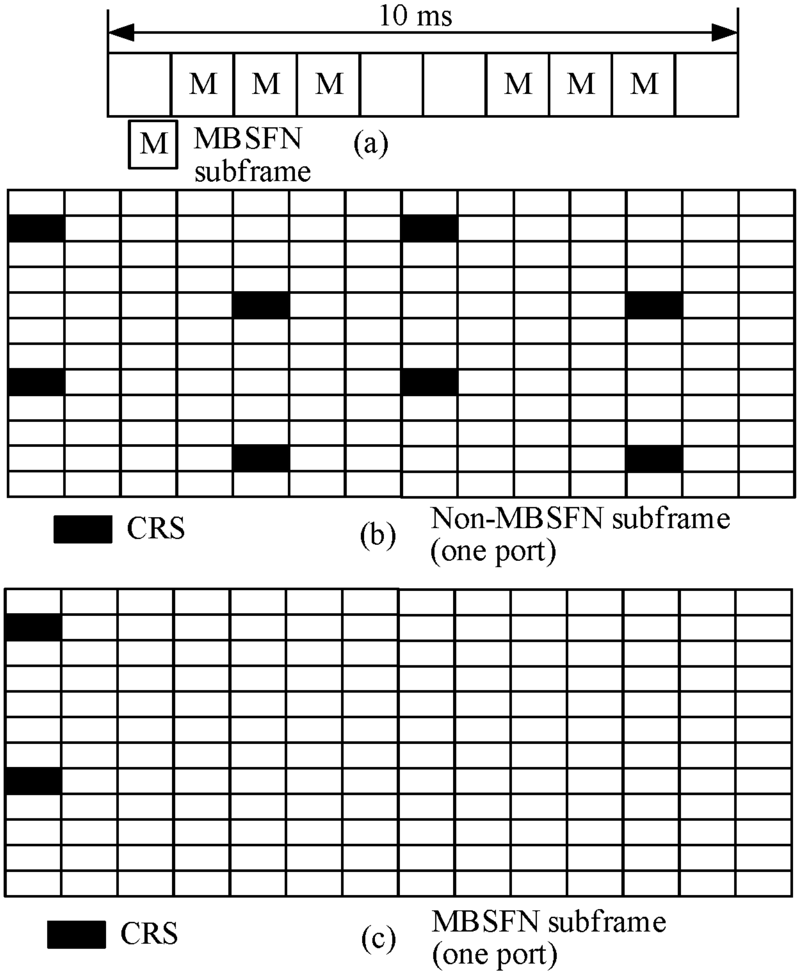
FIG. 13 is a schematic diagram of an MBSFN subframe configuration in an LTE cell according to an embodiment of this application.

When the preset condition is met, refer to FIG. 13. As shown in (a) in FIG. 13, in the first cell, the manner of sending the MBSFN subframe is changed to the following: The network device sends six MBSFN subframes every 10 milliseconds. A subframe marked with "M" represents the MBSFN subframe, and a subframe that is not marked with "M" represents the non-MBSFN subframe. Further, the port quantity of the CRS of the first cell is changed from 4 to 1. (b) in FIG. 13 is a schematic diagram of a structure of the non-MBSFN subframe when the port quantity of the CRS is 1. In this case, the quantity of CRS resources included in the non-MBSFN subframe is 8. (c) in FIG. 13 is a schematic diagram of a structure of the MBSFN subframe when the port quantity of the CRS is 1. In this case, the quantity of CRS resources included in the MBSFN subframe is 2, and is less than the quantity of CRS resources included in the non-MBSFN subframe.

With reference to the method described in FIG. 12 and FIG. 13, a person skilled in the art may further understand that the method may include a plurality of implementations. For example, the network device only increases the sending periodicity of the MBSFN subframe (in other words, increases the quantity of MBSFN subframes), or the network device only reduces the port quantity of the CRS resource, or may increase both the quantity of MBSFN subframes and the port quantity of the CRS resource in the MBSFN subframe, to finally increase a quantity of resources that can be used by the NR cell. Therefore, spectral efficiency of the NR cell is improved.

When determining that the first cell meets the preset condition, the network device may consider that a condition for shutting down the first cell is met, and therefore suspend providing a service for a terminal device in the first cell. The network device may further perform at least one of the following procedures.

1. A terminal device that has accessed the first cell is migrated to another co-coverage cell, and the first cell no longer provides a service for the terminal device. The co-coverage cell may be a cell whose coverage area is the same as that of the first cell.

2. The first cell no longer carries a new terminal device, to be specific, the first cell is set to a barred state, and a terminal device in an RRC idle mode is not allowed to initiate random access to the first cell.

3. A priority of the first cell is set to the lowest, so that the terminal device in the RRC idle mode is migrated to a cell with a high priority.

In a possible implementation, when an LTE intra-frequency neighboring cell surrounding the first cell measures that the first cell is the strongest neighboring cell, an LTE intra-frequency handover procedure is no longer triggered, but an inter-frequency/inter-system handover procedure starts. The terminal device is migrated to an inter-frequency/inter-RAT cell instead of the first cell, so that uplink and downlink co-channel interference between an LTE system and an NR system that is caused by untimely handover of the terminal device can be eliminated. That the first cell is the strongest neighboring cell may represent that a signal of the first cell is the strongest. For example, reference signal received power (RSRP) of the signal of the first cell is the largest.

S1102: The network device sends reconfiguration information to a terminal device in the second cell.

The reconfiguration information indicates a position of the CRS resource and the quantity of CRS resources in the first cell. A resource other than the CRS resource in a resource shared by the first cell and the second cell may be used for data transmission of the terminal device in the second cell. Because the quantity of CRS resources in the first cell is reduced, a quantity of resources that can be used by the second cell is increased, thereby improving spectral efficiency and increasing a data throughput of the second cell. The resource herein may be a time-frequency resource, for example, may be an RE resource.

The network device may send the reconfiguration information by using a first RRC reconfiguration message. The reconfiguration information may be a CRS rate matching pattern in the first RRC reconfiguration message. The CRS rate matching pattern may indicate the position of the CRS resource and the quantity of CRS resources in the first cell to the terminal device in the second cell, so that the terminal device in the second cell determines RE resources that are occupied by the CRS. Therefore, the terminal device performs processing on an RE resource other than the RE resource occupied by the CRS. For example, the processing may be demodulating data on a channel.

In a possible implementation, the network device may further cancel the first PDCCH in the first cell, and start to schedule the PDSCH from the 1st symbol in a time unit in the second cell. In other words, in a time unit, a scheduling range of the PDSCH of the second cell is a symbol 0 to a symbol 13 in the time unit.

In this embodiment of this application, the port quantity of the CRS of the first cell may be further restored to the port quantity that is of the CRS and that exits before the preset condition is met, and the manner of sending the MBSFN subframe in the first cell may be restored to the manner that is of sending the MBSFN subframe and that exists before the preset condition is met. For example, when detecting that the service load of the co-coverage neighboring cell of the first cell is greater than the second load, the network device may restore the port quantity of the CRS of the first cell to the port quantity that is of the CRS and that exists before the preset condition is met, and restore the manner of sending the MBSFN subframe in the first cell to the manner that is of sending the MBSFN subframe and that exists before the preset condition is met.

A process in which the network device restores the first cell to a state that exists before the preset condition is met may include at least one of the following.

(a) The network device changes a CRS port configuration and an MBSFN subframe configuration of the first cell. For example, the network device changes the port quantity of the CRS of the first cell to 4, and changes the manner of sending the MBSFN subframe to: configuring two MBSFN subframes every 40 milliseconds.

(b) The network device allows the terminal device in the RRC idle mode to normally access the first cell. For example, the network device no longer sets the first cell to the barred state, and allows the terminal device in the RRC idle mode to initiate random access to the first cell; or the network device restores the priority of the first cell, so that the terminal device in the RRC idle mode can be migrated to the first cell.

(c) The network device allows a terminal device in an RRC connected mode in a surrounding neighboring cell to be normally handed over to the first cell.

Similarly, the network device may further send a second RRC reconfiguration message to the terminal device in the second cell, where the second RRC reconfiguration message indicates that the port quantity of the CRS and the manner of sending the MBSFN subframe in the first cell are restored to the quantity and the manner that exist before the preset condition is met.

According to the foregoing method, the LTE cell may be deployed based on a requirement. To be specific, when an LTE network capacity is large, the LTE cell is activated to absorb LTE traffic; or when an LTE network capacity is small, the LTE cell is shut down to effectively reduce impact of the LTE cell on performance of the NR cell in a DSS scenario. In addition, the uplink and downlink co-channel interference between the LTE system and the NR system that is caused by handover of the terminal device can be reduced, thereby improving system stability.

The foregoing embodiments may be implemented separately, or may be implemented in combination with each other. In the foregoing specification, in different embodiments, differences between embodiments are described in emphasis. For content other than the differences, other content of different embodiments may be mutually referenced. It should be understood that not all steps shown in the flowcharts are mandatory steps, and some steps may be added or deleted based on the flowcharts based on an actual requirement.

To implement functions in the methods provided in embodiments of this application, the network device, the terminal device or the communication apparatus may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The module division in embodiments of this application is an example, and is merely logical function division. In an actual implementation, there may be another division manner. In addition, function modules in embodiments of this application may be integrated into one processor, or may exist alone physically, or two or more modules may be integrated into one module. The integrated module may be implemented in a form of hardware, or may be implemented in a form of a software function module.

Figure 14:
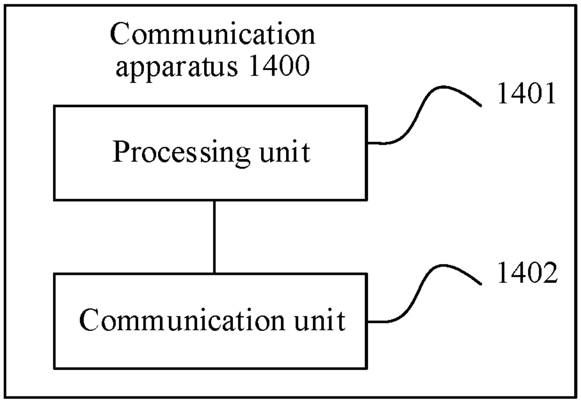
FIG. 14 is a schematic diagram of a structure of a communication apparatus according to an embodiment of this application.

Same as the foregoing concept, as shown in FIG. 14, an embodiment of this application further provides a communication apparatus 1400. The communication apparatus 1400 may be the terminal device in FIG. 1, and is configured to implement the method corresponding to the terminal device in the foregoing method embodiments. Alternatively, the communication apparatus may be the network device in FIG. 1, and is configured to implement the method corresponding to the network device in the foregoing method embodiments. For a specific function, reference may be made to the descriptions in the foregoing method embodiments.

Specifically, the communication apparatus 1400 may include a processing unit 1401 and a communication unit 1402. In this embodiment of this application, the communication unit may also be referred to as a transceiver unit, and may include a sending unit and/or a receiving unit, which are respectively configured to perform sending and receiving steps of the network device or the terminal device in the foregoing method embodiments. The following describes in detail the communication apparatus provided in this embodiment of this application with reference to FIG. 14 to FIG. 15.

In some possible implementations, when the behavior and the function of the network device in the method embodiment shown in FIG. 5 are implemented by using the communication apparatus 1400, the communication apparatus includes:

a processing unit, configured to determine a quantity of symbols occupied by a first physical downlink control channel of a first cell in a time unit, where the processing unit is configured to: determine, based on the quantity of symbols, the 1st symbol occupied by a physical downlink shared channel of a second cell in the time unit, where the first cell and the second cell are dynamic spectrum sharing cells.

In a possible implementation, the processing unit is configured to:

if the quantity of symbols is 0, determine that the 1st symbol occupied by the physical downlink shared channel of the second cell in the time unit is the 1st symbol in the time unit.

In a possible implementation, the communication unit is further configured to transmit data of the second cell by using a resource corresponding to a physical hybrid automatic repeat request indicator channel in the first cell, where the physical hybrid automatic repeat request indicator channel is located on the 1st symbol in the time unit.

In a possible implementation, the communication unit is further configured to transmit the data of the second cell by using a resource corresponding to a physical control format indicator channel in the first cell, where the physical control format indicator channel is located on the 1st symbol in the time unit.

In a possible implementation, the processing unit is configured to:

if it is determined not to use the first physical downlink control channel in the first cell, determine that the quantity of symbols occupied by the first physical downlink control channel is 0.

In a possible implementation, the processing unit is configured to:

if the quantity of symbols is 1, determine that the 1st symbol occupied by the physical downlink shared channel of the second cell in the time unit is the 2nd symbol in the time unit, where the first physical downlink control channel of the first cell occupies the 1st symbol in the time unit.

In a possible implementation, the processing unit is configured to:

if it is determined to use the first physical downlink control channel in the first cell and it is determined that the quantity of symbols occupied by the used first physical downlink control channel is less than 2, determine that the quantity of symbols occupied by the first physical downlink control channel is 1.

In a possible implementation, the communication unit is configured to send first information to a terminal device in the second cell, where the first information indicates the 1st symbol occupied by the physical downlink shared channel in the time unit.

In some possible implementations, when the behavior and the function of the terminal device in the method embodiment shown in FIG. 5 are implemented by using the communication apparatus 1400, the communication apparatus includes:

a communication unit, configured to receive, in a second cell, first information from a network device, where the first information indicates the 1st symbol occupied by a physical downlink shared channel of a second cell in a time unit, where the communication unit is configured to receive the physical downlink shared channel by using the 1st symbol, where the 1st symbol of the physical downlink shared channel in the time unit is determined based on a quantity of symbols occupied by a first physical downlink control channel of a first cell in the time unit, and the first cell and the second cell dynamically share a same spectrum resource.

In a possible implementation, if the quantity of symbols is 0, the 1st symbol occupied by the physical downlink shared channel of the second cell in the time unit is the 1st symbol in the time unit.

In a possible implementation, the communication unit is further configured to send or receive data in a resource corresponding to a physical hybrid automatic repeat request indicator channel in the first cell, where the physical hybrid automatic repeat request indicator channel is located on the 1st symbol in the time unit.

In a possible implementation, the communication unit is further configured to: send or receive data in a resource corresponding to a physical control format indicator channel in the first cell, where the physical control format indicator channel is located on the 1st symbol in the time unit.

In some possible implementations, when the behavior and the function of the network device in the method embodiment shown in FIG. 11 are implemented by using the communication apparatus 1400, the communication apparatus includes:

a processing unit, configured to: if a preset condition is met, reconfigure a quantity of cell-specific reference signal resources of a first cell, where the reconfigured quantity of cell-specific reference signal resources is less than a quantity of cell-specific reference signal resources before the reconfiguration; and a communication unit, configured to send reconfiguration information to a terminal device in a second cell, where the reconfiguration information indicates a position of the cell-specific reference signal resource and the quantity of cell-specific reference signal resources, and a resource other than the cell-specific reference signal resource in a resource shared by the first cell and the second cell is used for data transmission of the terminal device in the second cell, and the first cell and the second cell are dynamic spectrum sharing cells.

In a possible implementation, reconfiguring the quantity of cell-specific reference signal resources of the first cell includes: changing a port quantity of a cell-specific reference signal of the first cell from a first quantity to a second quantity, where the first quantity is greater than the second quantity.

In a possible implementation, the processing unit is configured to: change a manner of sending a multimedia broadcast multicast service single frequency network subframe of the first cell from a first manner to a second manner, where periodicity duration corresponding to the first manner is first duration, and a quantity of multimedia broadcast multicast service single frequency network subframes sent in a periodicity corresponding to the first manner is a third quantity; periodicity duration corresponding to the second manner is second duration, and a quantity of multimedia broadcast multicast service single frequency network subframes included in a periodicity corresponding to the second manner is a fourth quantity; and changing the manner of sending the multimedia broadcast multicast service single frequency network subframe of the first cell from the first manner to the second manner includes: the first duration is greater than the second duration, and/or the third quantity is less than the fourth quantity.

In a possible implementation, the preset condition includes at least one of the following: a service load of the first cell is less than or equal to a first load; and a service load of a co-coverage neighboring cell of the first cell is less than or equal to a second load.

In a possible implementation, the communication unit is further configured to suspend providing a service for a terminal device in the first cell.

In a possible implementation, the 1st symbol occupied by a physical downlink shared channel of the second cell in a time unit is the 1st symbol in the time unit.

The communication unit may also be referred to as a transceiver, a transceiver machine, a transceiver apparatus, or the like. The processing unit may also be referred to as a processor, a processing board, a processing module, a processing apparatus, or the like. Optionally, a component configured to implement a receiving function in the communication unit 1402 may be considered as a receiving unit, and a component configured to implement a sending function in the communication unit 1402 may be considered as a sending unit. That is, the communication unit 1402 includes a receiving unit and a sending unit. The communication unit sometimes may also be referred to as a transceiver machine, a transceiver, a transceiver circuit, or the like. The receiving unit sometimes may also be referred to as a receiver, a receiver machine, a receiving circuit, or the like. The sending unit sometimes may also be referred to as a transmitter, a transmitter machine, a transmitter circuit, or the like.

The foregoing is merely an example. The processing unit 1401 and the communication unit 1402 may further perform other functions. For more detailed descriptions, refer to the related descriptions in the method embodiment shown in FIG. 5 or FIG. 11. Details are not described herein again.

Figure 15:
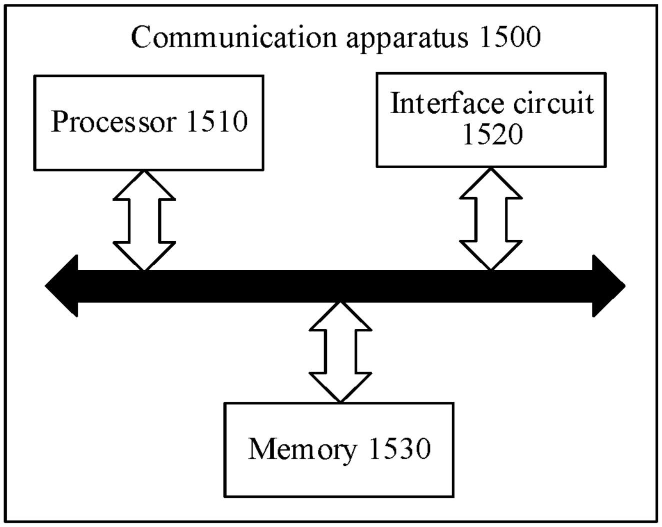
FIG. 15 is a schematic diagram of a structure of a communication apparatus according to an embodiment of this application.

FIG. 15 shows a communication apparatus 1500 according to an embodiment of this application. The communication apparatus shown in FIG. 15 may be an implementation of a hardware circuit of the communication apparatus shown in FIG. 14. The communication apparatus may be applicable to the foregoing flowchart, and may perform the functions of the terminal device or the network device in the foregoing method embodiments. For ease of description, FIG. 15 shows only main components of the communication apparatus.

As shown in FIG. 15, a communication apparatus 1500 includes a processor 1510 and an interface circuit 1520. The processor 1510 and the interface circuit 1520 are coupled to each other. It may be understood that the interface circuit 1520 may be a transceiver or an input/output interface. Optionally, the communication apparatus 1500 may further include a memory 1530, which is configured to store instructions executed by the processor 1510, or store input data needed by the processor 1510 to run the instructions, or store data generated after the processor 1510 runs the instructions.

When the communication apparatus 1500 is configured to implement the method shown in FIG. 5 or FIG. 11, the processor 1510 is configured to implement the function of the processing unit 1401, and the interface circuit 1520 is configured to implement the function of the communication unit 1402.

When the communication apparatus is a chip used in a terminal device, the chip in the terminal device implements the functions of the terminal device in the foregoing method embodiments. The chip in the terminal device receives information from another module (for example, a radio frequency module or an antenna) in the terminal device, where the information is sent by a network device to the terminal device; or the chip in the terminal device sends information to another module (for example, a radio frequency module or an antenna) in the terminal device, where the information is sent by the terminal device to a network device.

When the communication apparatus is a chip used in a network device, the chip in the network device implements the functions of the network device in the foregoing method embodiments. The chip in the network device receives information from another module (for example, a radio frequency module or an antenna) in the network device, where the information is sent by a terminal device to the network device; or the chip in the network device sends information to another module (for example, a radio frequency module or an antenna) in the network device, where the information is sent by the network device to a terminal device.

It may be understood that the processor in embodiments of this application may be a central processing unit (CPU), or may be another general-purpose processor, a digital signal processor (DSP), an application-specific integrated circuit (ASIC), a field programmable gate array (FPGA), or another programmable logic device or a transistor logic device. The general-purpose processor may be a microprocessor, or may be any conventional processor.

The memory in embodiments of this application may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, or any other form of storage medium well known in the art. An example storage medium is coupled to the processor, so that the processor can read information from the storage medium and can write information to the storage medium. It is clear that the storage medium may alternatively be a component of the processor. The processor and the storage medium may be located in an ASIC. In addition, the ASIC may be located in a network device or a terminal device. The processor and the storage medium may alternatively exist in the network device or the terminal device as discrete components.

A person skilled in the art should understand that embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. Therefore, this application is intended to cover these modifications and variations of this application provided that they fall within the scope of the claims of this application and their equivalent technologies.

What is claimed is:

1. A scheduling method, comprising:

determining a quantity of symbols occupied by a first physical downlink control channel of a first cell in a time unit; and determining, based on the quantity of symbols, the 1st symbol occupied by a physical downlink shared channel of a second cell in the time unit, wherein the first cell and the second cell are dynamic spectrum sharing cells.

2. The method of claim 1, wherein the determining, based on the quantity of symbols, the 1st symbol occupied by the physical downlink shared channel of the second cell in the time unit comprises:

in response that the quantity of symbols is 0, determining that the 1st symbol occupied by the physical downlink shared channel of the second cell in the time unit is the 1st symbol in the time unit.

3. The method of claim 2, the method further comprising:

transmitting data of the second cell by using a resource corresponding to a physical hybrid automatic repeat request indicator channel in the first cell, wherein the physical hybrid automatic repeat request indicator channel is located on the 1st symbol in the time unit.

4. The method of claim 2, the method further comprising:

transmitting the data of the second cell by using a resource corresponding to a physical control format indicator channel in the first cell, wherein the physical control format indicator channel is located on the 1st symbol in the time unit.

5. The method of claim 1, wherein the determining the quantity of symbols occupied by the first physical downlink control channel of the first cell in the time unit comprises:

in response to determining not to use the first physical downlink control channel in the first cell, determining that the quantity of symbols occupied by the first physical downlink control channel is 0.

6. The method of claim 1, wherein the determining, based on the quantity of symbols, the 1st symbol occupied by the physical downlink shared channel of the second cell in the time unit comprises:

in response that the quantity of symbols is 1, determining that the 1st symbol occupied by the physical downlink shared channel of the second cell in the time unit is the 2nd symbol in the time unit, wherein the first physical downlink control channel of the first cell occupies the 1st symbol in the time unit.

7. The method of claim 6, wherein the determining the quantity of symbols occupied by the first physical downlink control channel of the first cell in the time unit comprises:

in response to determining to use the first physical downlink control channel in the first cell and determining that the quantity of symbols occupied by the used first physical downlink control channel is less than 2, determining that the quantity of symbols occupied by the first physical downlink control channel is 1.

8. The method of claim 1, the method further comprising:

sending first information to a terminal device in the second cell, wherein the first information indicates the 1st symbol occupied by the physical downlink shared channel in the time unit.

9. A communication apparatus, comprising:

a processor; and a non-transitory computer-readable storage medium storing a program to be executed by the processor, the program including instructions to:

determine a quantity of symbols occupied by a first physical downlink control channel of a first cell in a time unit; and determine, based on the quantity of symbols, the 1st symbol occupied by a physical downlink shared channel of a second cell in the time unit, wherein the first cell and the second cell are dynamic spectrum sharing cells.

10. The apparatus of claim 9, wherein the program including instructions to:

in response that the quantity of symbols is 0, determine that the 1st symbol occupied by the physical downlink shared channel of the second cell in the time unit is the 1st symbol in the time unit.

11. The apparatus of claim 10, wherein the program further including instructions to:

transmit data of the second cell by using a resource corresponding to a physical hybrid automatic repeat request indicator channel in the first cell, wherein the physical hybrid automatic repeat request indicator channel is located on the 1st symbol in the time unit.

12. The apparatus of claim 10, wherein the program further including instructions to:

transmit the data of the second cell by using a resource corresponding to a physical control format indicator channel in the first cell, wherein the physical control format indicator channel is located on the 1st symbol in the time unit.

13. The apparatus of claim 9, wherein the program including instructions to:

in response to determining not to use the first physical downlink control channel in the first cell, determine that the quantity of symbols occupied by the first physical downlink control channel is 0.

14. The apparatus of claim 9, wherein the program further including instructions to:

in response that the quantity of symbols is 1, determine that the 1st symbol occupied by the physical downlink shared channel of the second cell in the time unit is the 2nd symbol in the time unit, wherein the first physical downlink control channel of the first cell occupies the 1st symbol in the time unit.

15. The apparatus of claim 14, wherein the program including instructions to:

in response to determining to use the first physical downlink control channel in the first cell and determining that the quantity of symbols occupied by the used first physical downlink control channel is less than 2, determine that the quantity of symbols occupied by the first physical downlink control channel is 1.

16. The apparatus of claim 9, wherein the program further including instructions to:

send first information to a terminal device in the second cell, wherein the first information indicates the 1st symbol occupied by the physical downlink shared channel in the time unit.

17. A non-transitory computer-readable medium storing computer-executable instructions that, when executed by a communication apparatus, cause the communication apparatus to:

determine a quantity of symbols occupied by a first physical downlink control channel of a first cell in a time unit; and determine, based on the quantity of symbols, the 1st symbol occupied by a physical downlink shared channel of a second cell in the time unit, wherein the first cell and the second cell are dynamic spectrum sharing cells.

18. The non-transitory computer-readable medium of claim 17, wherein the determine, based on the quantity of symbols, the 1st symbol occupied by the physical downlink shared channel of the second cell in the time unit comprises:

in response that the quantity of symbols is 0, determine that the 1st symbol occupied by the physical downlink shared channel of the second cell in the time unit is the 1st symbol in the time unit.

19. The non-transitory computer-readable medium of claim 18, wherein the computer-executable instructions, when executed by the communication apparatus, further cause the communication apparatus to transmit data of the second cell by using a resource corresponding to a physical hybrid automatic repeat request indicator channel in the first cell or a physical control format indicator channel in the first cell, wherein the physical hybrid automatic repeat request indicator channel is located on the 1st symbol in the time unit, and the physical control format indicator channel is located on the 1st symbol in the time unit.

20. The non-transitory computer-readable medium of claim 17, wherein the determine, based on the quantity of symbols, the 1st symbol occupied by the physical downlink shared channel of the second cell in the time unit comprises:

in response that the quantity of symbols is 1, determine that the 1st symbol occupied by the physical downlink shared channel of the second cell in the time unit is the 2nd symbol in the time unit, wherein the first physical downlink control channel of the first cell occupies the 1st symbol in the time unit.

* * * * *